Oct. 3, 1967 J. F. SUTHERLAND ET AL 3,345,540

THERMAL JUNCTION REFERENCE CABINET

Filed Sept. 23, 1966 3 Sheets-Sheet 1

WITNESSES

Theodore F. Wrobel

Robert C Baird

INVENTORS

Stephen Schmandrak, James F. Sutherland and Francis D. Plociennik

BY E. F. Possessky

ATTORNEY

Oct. 3, 1967 J. F. SUTHERLAND ET AL 3,345,540

THERMAL JUNCTION REFERENCE CABINET

Filed Sept. 23, 1966 3 Sheets-Sheet 3

3,345,540
THERMAL JUNCTION REFERENCE CABINET

James F. Sutherland, Pittsburgh, Francis D. Plociennik, Willow Grove, and Stephen Schmandrak, Pittsburgh, Pa., assignors to Westinghouse Electric Corporation, Pittsburgh, Pa., a corporation of Pennsylvania Filed Sept. 23, 1966, Ser. No. 581,468
9 Claims. (Cl. 317—99)

ABSTRACT OF THE DISCLOSURE

Thermal junction reference terminals associated with a plurality of thermocouple circuits are housed in a cabinet which passively holds the terminals at a uniform reference temperature used by a computer or other means in calculating the temperatures of the remote thermocouple circuit junctions. The cabinet construction allows convenient terminal wiring while preventing the uniform reference temperature from following short term transients in the ambient temperature.

*Background of the invention*

The present invention relates to thermal junction re-reference cabinets and more particularly to such cabinets in which temperature maintenance is effected without the use of active heating and cooling controls.

In a thermal junction reference cabinet, a plurality of electrically isolated circuit junctions are mounted to be held at a reference temperature. For example, each circuit may be a thermocouple circuit associated with a particular point in a controlled material flow or other process. Each thermocouple circuit thus may comprise a pair of thermocouple wires extending up to 1000 feet or more from the hot thermocouple junction at the process to the cold thermocouple junction maintained at a reference temperature in the thermal junction reference cabinet. The cold junction is held at a known reference temperature in order to enable the hot junction temperature to be determined from the thermally developed voltage across the thermocouple circuit.

One thermocouple wire in each circuit might be iron while the other is constantan. Physically, each cold junction may comprise a pair of electrically isolated terminals mounted in the thermal junction reference cabinet with the associated thermocouple wires extending through a cabinet entry point and connected to the terminals. Separate copper wires typically are extended from the terminal connections and through a cabinet exit point to make the thermocouple voltage available for external measurement or control use.

The reference temperature of the cold junctions can be held substantially constant by means of controlled heating and cooling of the cabinet interior. A thermal inertia terminal support plate and cabinet insulation can be used to facilitate cold junction temperature maintenance. Alternatively, the active temperature control can be eliminated and the thermal junction reference cabinet can be arranged so that the cold junction reference temperature drifts with temperature changes in the ambient about the cabinet to an extent determined by the character of cabinet construction.

The latter scheme is the type of thermal junction reference cabinet to which the present invention is directed. Cabinets of this type have general utility and are often employed in applications where a large number of thermocouple circuits are used in a system and a programmed digital computer is provided to process the reference temperature and thermocouple voltage data in determining the various hot junction temperatures for indicational or control purposes. In computer applications, a resistance temperature detector circuit or the like is mounted in the cabinet in order to transmit cold junction reference temperature data to the computer for the hot junction temperature calculations. In general usage, high cabinet performance requires accurate and uniform cold junction terminal temperature maintenance as a function of long term steady state ambient temperature changes.

*Summary of the invention*

In accordance with the principles of the present invention, a thermal junction reference cabinet comprises a thermally insulated and readily assembled enclosure within which one or more thermal plates are supported. In turn, one or more plate mounted members support a predetermined number of terminal pairs to which entry wiring is established through readily accessible and sealable cabinet entry points. Exit wiring is similarly conveniently made through readily sealable cabinet exit points. The relative locations of the entry and exit wiring and the entry and exit terminal connections provide a high degree of entry and exit circuit isolation to provide for quick and nonconfusing cabinet installation. The overall cabinet structural arrangement is characterized with manufacturing and installation economy and provides highly accurate and uniform reference terminal temperature maintenance as a long term steady state function of cabinet ambient temperature for one or more thermal junction circuits up to a relatively large number of thermal junction circuits. The cabinet is adaptable to mass production and is especially useful in computer or other large systems since a standard cabinet module size can be selected and any number of thermal junction circuits up to the cabinet capacity number can be installed in the standard sized cabinet without adversely affecting cabinet reference temperature performance.

It is therefore an object of the invention to provide a novel thermal junction reference cabinet having improved reference temperature maintenance capability.

Another object of the invention is to provide a novel thermal junction reference cabinet in which thermal circuit junctions are provided with highly accurate and highly uniform temperature maintenance as a long term steady state function of cabinet ambient temperature.

A further object of the invention is to provide a novel thermal junction reference cabinet characterized with improved reference temperature operation and manufacturing economy.

An additional object of the invention is to provide a novel thermal junction reference cabinet characterized with improved reference temperature operation as well as a capacity for accepting any number up to a relatively high number of circuits which are to be provided with commonly maintained junction terminal temperatures.

It is another object of the invention to provide a novel thermal junction reference cabinet characterized with improved reference temperature operation as well as effective isolation between a user's entry wiring and terminal connections and the manufacturer's exit wiring and terminal connections so as to enable quick and nonconfusing field installation.

It is a further object of the invention to provide a novel thermal junction reference cabinet characterized with convenient cabinet assembly and circuit connections consistently with a high degree of thermal isolation of the internal circuit junction terminals from the cabinet ambient and improved reference temperature operation.

It is an additional object of the invention to provide a novel thermal junction reference cabinet characterized with improved reference temperature operation and a high degree of thermal sealing of entry and exit wiring consistently with wiring convenience.

These and other objects of the invention will become more apparent upon consideration of the following detailed description along with the attached drawings.

DESCRIPTION OF THE PREFERRED EMBODIMENT

Figure 2:
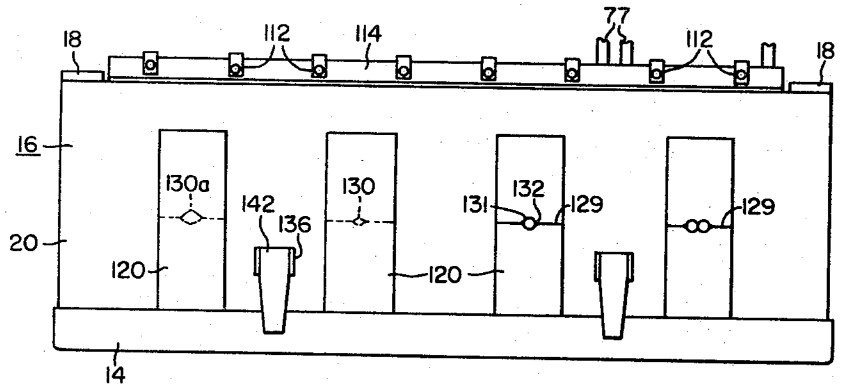
FIG. 2 shows a top plan view of the cabinet shown in FIG. 1.
Figure 1:
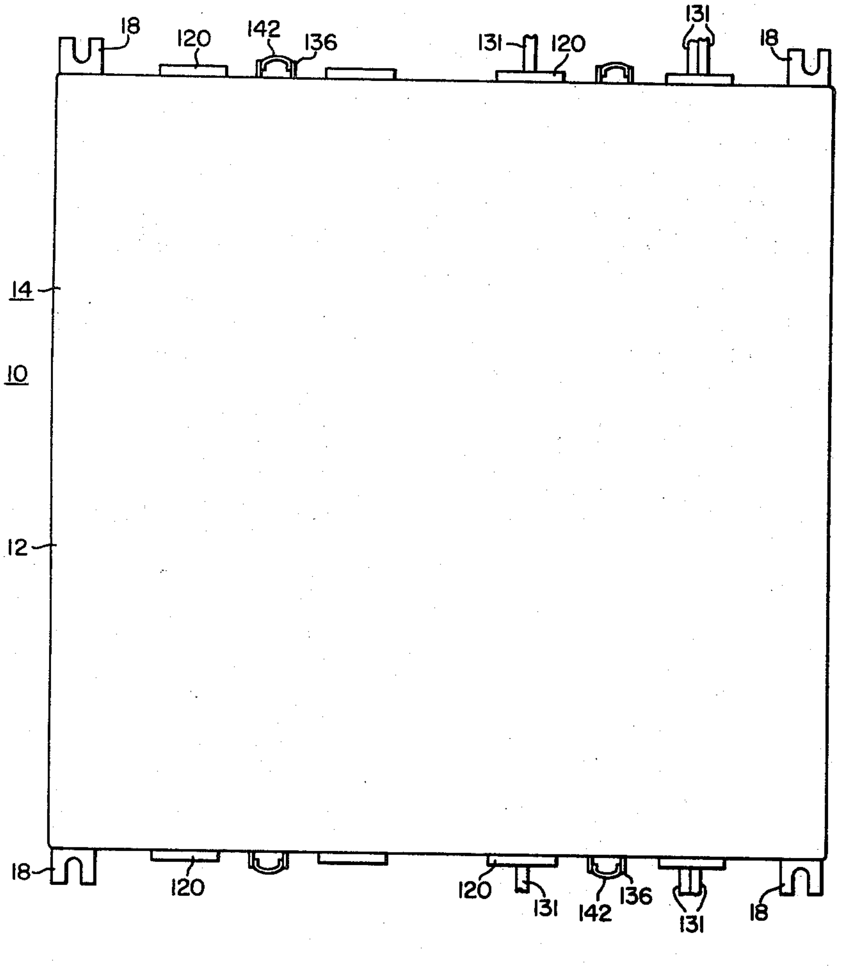
FIGURE 1 shows a front view of a thermal junction reference cabinet constructed in accordtnce with the principles of the invention.

More specifically, there is shown in FIG. 1 a thermal junction reference cabinet 10 arranged in accordance with the principles of the invention. The cabinet 10 is provided with an enclosure 12 formed from a front cover 14 and a body member 16 having a plurality of lugs 18 for mounting the cabinet 10 at the installation site. Sheet steel or other suitable material can be employed in manufacturing the cover and body parts 14 and 16. The exterior physical dimensions of the cabinet 10 can for example be about 23 inches by 25 inches by 8 inches.

Figure 3:
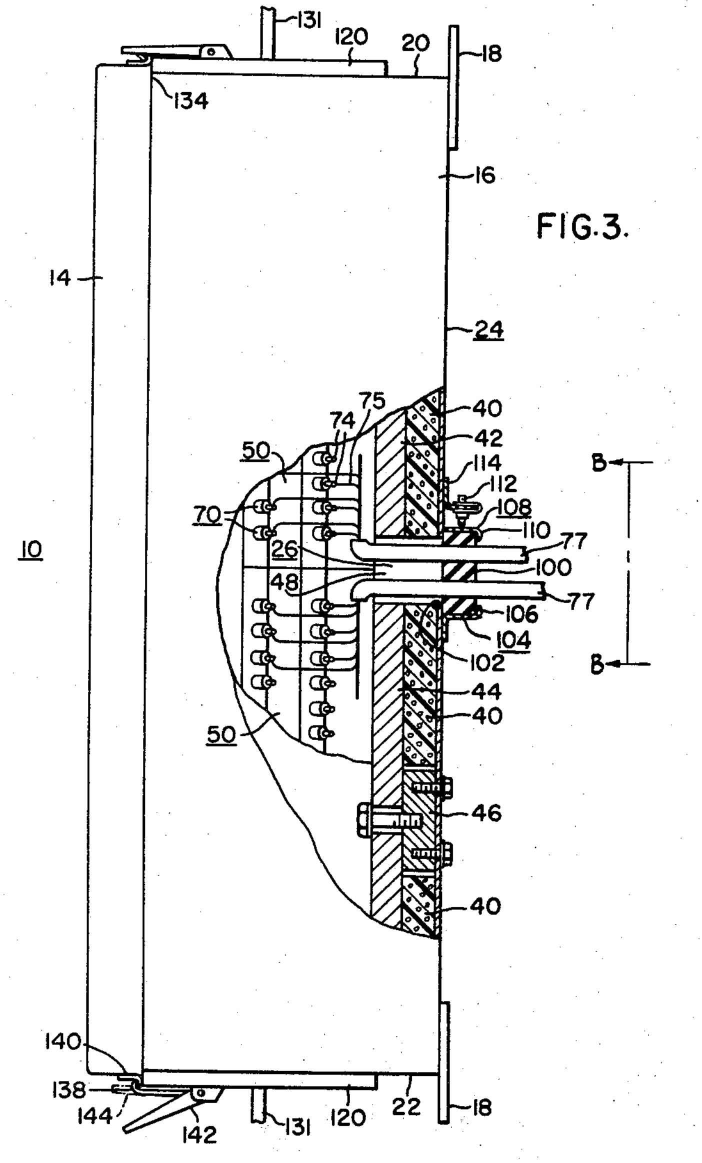
FIG. 3 shows a side view of the cabinet with portions thereof cut away to illustrate certain interior structural details.
Figure 6:
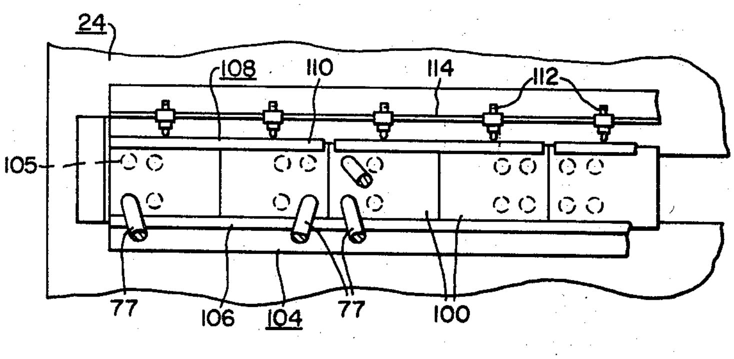
FIG. 6 shows a partial rear view of the cabinet taken from the reference line B—B in FIG. 3.

Entry wiring to the cabinet 10 is provided through top and bottom walls 20 and 22 of the cabinet body 16. Exit wiring is provided through a rear body wall 24 at a region thereof indicated by the reference character 26 (FIG. 3).

Figure 5:
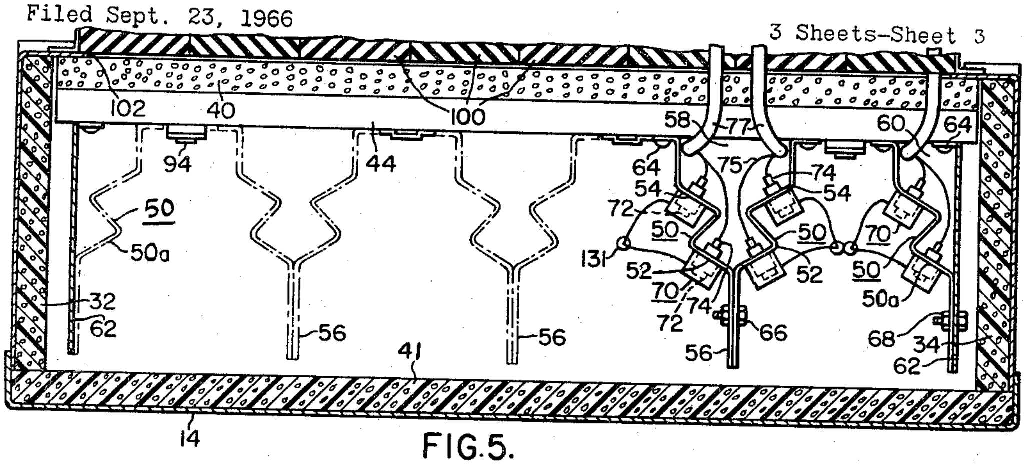
FIG. 5 shows a cross section of the cabinet having portions thereof removed and taken along the reference line A—A of FIG. 4.
Figure 4:
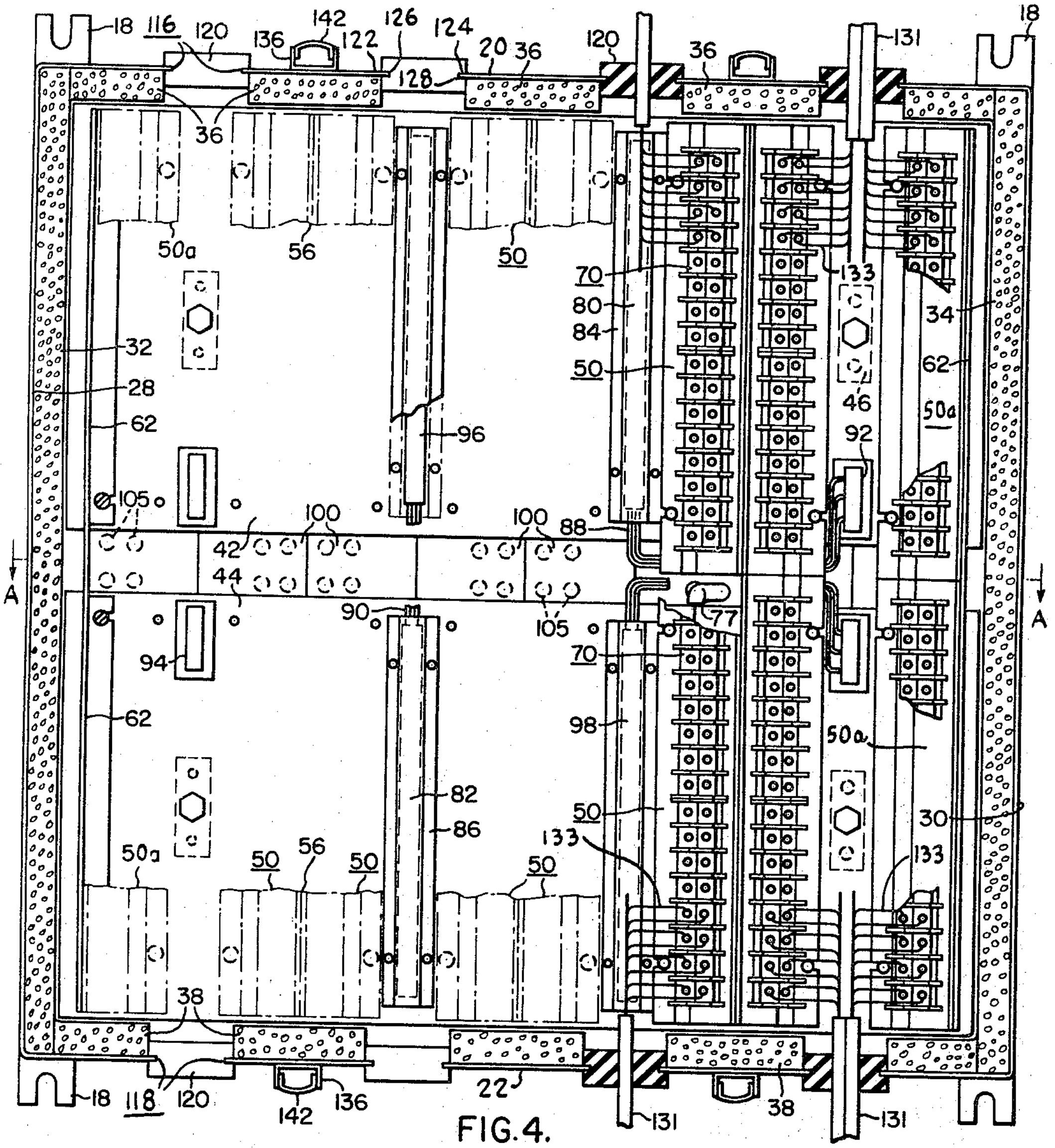
FIG. 4 shows a front view of the cabinet with a front cover thereof removed.

The cabinet cover 14 is secured over a front open side of the cabinet body 16 and about top and bottom or end walls 20 and 22 and side body walls 28 and 30. In general, thermal isolation is provided between the cabinet interior and the cabinet ambient by means of suitable thermally insulative material such as appropriately sized and fitted foam members disposed against or adhered to inwardly facing cabinet surfaces as indicated by reference characters 32, 34, 36, 38 (FIG. 4) and 40, 41 (FIGS. 3 and 5).

Within the thermal junction reference cabinet 10 there is provided at least one thermal reference plate and, in this instance, a pair of thermal reference plates 42 and 44 secured in relation to the rear body wall 24 and in vertically spaced relation to each other. To space the thermal plates 42 and 44 frontwardly of the rear body wall 24 and thereby provide for intermediate placement of the thermally insulative foam material 40, each plate 42 or 44 is mounted on a pair of relatively rigid thermally insulative spacers 46 which in turn are secured to the rear body wall 24. A suitable material for the spacers 46 is one sold commercially under the trade name "Micarta." The thermal plates 42 and 44 are accordingly substantially thermally insulated against conductive heat exchange with the cabinet exterior, and with suitable mass the plates 42 and 44 have substantial thermal inertia for plate temperature maintenance. To assure relatively uniform plate temperature distribution the plates 42 and 44 are formed from a material having sufficiently high thermal conductivity. For example, the plates 42 and 44 can be formed from three-quarter-inch aluminum plate.

In conjunction with the overall thermal insulating features of the cabinet 10, the plates 42 and 44 provide a long term thermal time constant which provides effective filtration of transient temperature changes in the cabinet ambient so that the plate temperature follows only long term steady state cabinet ambient temperature changes. As subsequently more fully described, accurate and uniform junction terminal reference temperatures are thereby obtained.

In larger thermal junction reference cabinets such as the presently described one, it has been empirically determined that the provision of two or more thermal plates as opposed to one thermal plate aids in achieving better uniformity and accuracy of the circuit junction terminal temperatures. Location of the plates 42 and 44 with vertical spacing 48 located therebetween and in alignment with the exit wiring region 26 facilitates the making of exit wiring to the cabinet exterior from junction terminals supported on the plates 42 and 44.

One or more elongated terminal support members 50 can be mounted on each terminal plate 42 or 44. In this instance, a total of eight terminal support members 50 are mounted on each thermal plate 42 or 44. A material such as cadmium plated steel can be used in forming the terminal support members 50 so as to provide an economic yet durable terminal support structure which has adequate mechanical strength and thermal conductivity.

In general, each terminal support member 50 has its elongated dimension extending in the vertical direction along nearly the entire height of the associated thermal plate 42 or 44. As used herein, the term "elongated" is meant to provide a geometrical reference for facilitated description and is not intended to be a structural limitation.

Each terminal support member 50 is provided with a pair of spaced vertically extending terminal support strips 52 and 54 which face angularly toward the cabinet front side as observed in FIG. 5 in order to facilitate access for entry terminal wiring. The structural form of the terminal support members 50 is such that, with a pair of the members 50 connected in back-to-back relation as indicated by the reference character 56, a vertically extending wiring channel 58 is formed by the rearward facing surfaces of the members 50 and an associated frontally facing surface portion of the plate 42 or 44. A similar wiring channel 60 is formed between each of a pair of spaced end terminal support members **50*a* and respective associated supporting brackets 62. A base flange of each terminal support member 50 or 50*a* can be secured to the associated thermal plate 42 or 44 as indicated by the reference character 64, and frontally located flanges of the terminal support members 50 or 50*a* can be secured to each other or to the brackets 62, as indicated by the reference character 66 or 68, in order to provide secure thermal plate mounting of the members 50 and 50*a* and to form the described vertically extending wiring channels 58 and 60**.

In this instance, eight pairs of terminals 70 are mounted on the terminal support strips 52 and 54 of each support member 50 or **50*a*. Each terminal is provided with suitable wire securing means 72 located on the frontally facing side of the strip 52 or 54 as well as suitable wire securing means 74 located on the rearwardly facing side of the strip 52 or 54. The rearwardly located wire securing means 74 are used to provide for exit wiring connections to the terminals 70 while the frontally located wire securing means 72 are used to provide entry wiring connections to the terminals 70**.

When wiring the thermal junction reference cabinet 10, predetermined terminals 70 are grouped in pairs which form respective cold junctions of respective thermocouple circuits entered into the cabinet 10. For example, horizontally aligned terminals on the respective strips 52 and 54 of the same support member 50 or 50a can be preselected as the junction terminal pairings.

Exit wiring is usually installed by the manufacturer with the use of suitable cables. The various wires are connected to the terminals 70 as indicated representatively at 75 (FIG. 3) by means of the securing means 74 and, as the support members 50 and 50a are mounted, the cabled wires are extended through the wiring channel 58 or 60 to the space 48 between the thermal plates 42 and 44 for passage through the rear wiring exit region 26 to the cabinet exterior. For the present embodiment of the invention two 16 pair cables 77 (only one shown) can be used in making the exit wiring for each back-to-back terminal support member pair 56. A single 16 pair cable (not shown) can be used for the terminal support members 50a. Since the manufacturer's exit wiring terminal connections are inaccessibly located to the rear of the terminal support members 50 and 50a after support member assembly to the thermal plates 42 and 44, entry wiring can be readily connected by the user to the frontally located terminal securing means 72 during cabinet installation in the field without disturbing the existing exit terminal connections and without confusion otherwise resulting from frontally exposed exit wiring connections.

If desired, a duplicate system of exit cables (not shown) can be connected from the rear side of the terminals 70 for extension through the rear exit region 26. The primary exit wiring can then be coupled through suitable external connectors (not shown) to an analog to digital converter unit at the input of a digital computer (not shown) and the duplicate set can be coupled to a secondary scan system (not shown) which is used in the event of computer failure.

Resistance temperature detectors 80 and 82 are suitably mounted on the respective thermal plates 42 and 44 with the use of respective thermally conductive or metallic covers 84 and 86. Each resistance temperature detector 80 or 82 is coupled through circuit wires 88 or 90 to a terminal block 92 or 94 suitably mounted on the thermal plate 42 or 44. Exit wiring (not shown) from the terminal blocks 92 and 94 connects the resistance temperature detectors 80 and 82 in respective suitable resistance thermometer circuits (not indicated) which generate electrical signals for use in the computer in determining the reference junction terminal temperature. A pair of resistance temperature detectors 96 and 98 can also be provided with similar circuit wiring for use in the secondary parallel scan system if a system of this type is to be used.

At the wiring exit region 26, a plurality of wire support blocks 100 are approximately sized to extend across and cover a slot-like opening 102 in the rear cabinet body wall 24. The blocks 100 are formed from an electrically insulative and preferably deflectable and resilient material such as a suitable vinyl plastic. Each block 100 is predrilled with appropriately sized cable openings 105 so that the required total number of cable openings are provided when the blocks 100 are assembled with the cabinet body 16. To support the blocks 100 in position, a horizontally extending ledge 104 having an outer upturned block retaining lip 106 is provided on the cabinet body back wall 24.

After the blocks 100 are located and the manufacturer's exit wiring is completed by extension of exit cables through the holes 105 in the support blocks 100, one or more movable plate members 108 having a downwardly extending retaining lip 110 are pressed against the top of the blocks 100 to produce a tight seal about the exit cables and to seal the blocks 100 against the cabinet rear wall 24 and about the rear wall slot-like opening 102. Suitable adjustable locking screws 112, mounted on a horizontally projecting bracket 114 which extends across the rear body wall 24, are employed to apply the required pressure on the plates 108. When the rear assembly is completed, the blocks 100 thus support the exit cables and provide the cabinet interior with substantial thermal insulation from the exterior over the exit region 26.

Front or entry wiring is normally accomplished by the user and is conveniently achieved after unlatching and removing the front cover 14. Thus, a plurality of slots 116 and 118 are formed in the top and bottom body member walls 20 and 22 for passage of entry wiring. Each slot 116 or 118 is open to the body member front side and extends rearwardly to a predetermined depth. A wire support block 120 is inserted in each slot 116 or 118 and is formed from a deflectable and resilient electrically insulative material such as a vinyl plastic. Each block 120 covers the associated slot 116 or 118 and is supported in place by substantially thermally sealing and mating engagement of opposite and rearwardly extending block slots 122 and 124 with associated rearwardly extending wall slot edge portions 126 and 128 of the top or bottom wall 20 or 22.

In executing the entry wiring, predetermined wire pairs for respective thermocouple circuits may be combined in a single cable. For example, 16 pair cables can be employed in the required number so that each entry cable is directed to a single back-to-back terminal support member pair 56 or an end terminal support member 50a.

Each entry wiring block 120 is preferably divided into two parts as indicated by the reference character 129 and preferably provided with one suitably sized opening or notch 130 between the parts for acceptance of one or more entry cables. The size of the notch 130 is adjusted (as by enlargement indicated at 130a) to the number of entry cables to be accommodated thereby. More than one cable entry notch (not indicated) can be provided in each block 120 if desired. In the preferred entry cable support scheme, the manufacturer or the user can divide the blocks 120 in two and make the necessary notches 130.

The entry cables (indicated representatively at 131) are located singly or multiply in the notches 130 after slot insertion of the rear parts of the blocks 120. After assembly of the front parts of the blocks 120 and after terminal connections have been made for the entry wiring as representatively indicated at 133 (FIG 4), pressure is applied to the front side of the blocks 120 to cause the block material to seal against the entry cables extended therethrough as indicated by the reference character 132. A good thermal seal at each cable entry point is thus provided.

Entry cable sealing pressure is provided by securing force from the cover 14 which has a rearward facing surface 134 in abutment with a frontally facing surface of each block 120. The cover 14 in turn is clamped in place by a plurality of latches 136. In this instance, a total of four latches 136 are provided at the top and bottom of the cabinet 10.

Each of the latches 136 has a pivotal body mounted arm 138 that interengages with a cover arm piece 140 thereby holding the cover 14 against the cabinet body 16. A latch operating arm 142 is pivoted outwardly to move the pivot point of the arm 138 and allow the arms 138 and 140 to be engaged or disengaged. Preferably, the interengagement of the arms 138 and 140 is made adjustable as by a screw member 144 which fixes the latched position of the pivot point of the arm 138. In this manner, thermal sealing cover pressure on the entry cables is made adjustable. It is noted that interengagement of the insulative foam members 32, 34, 36 and 38 with the foam member 41 along the side and top and bottom cabinet walls provides for good thermal sealing between the cover 14 and the cabinet body member 16.

The cabinet 10 is characterized with economic and high thermal performance construction. Entry and exit wiring is conveniently and economically made, yet good thermal sealing is realized in the cabinet 10. As a result of the overall construction and thermal isolation of the cabinet interior from the ambient, a substantially uniform junction temperature is held for all junction terminals 70. The terminal temperature accurately tracks the thermal plate temperature which in turn follows only relatively long term steady state cabinet ambient temperature changes. In a sample unit constructed substantially in accordance with the structure described for the illustrated embodiment, two hundred twenty four junction terminal pairs and associated wiring were provided and the terminals were substantially uniformly held within ±¼° F. of the thermal plate temperature for an ambient temperature change rate of 10° F. or less per half hour. Fewer terminal pairs and associated wiring provide substantially the same reference temperature performance in the same sample unit.

The foregoing description has been presented only to illustrate the principles of the invention. Accordingly, it is desired that the invention be not limited by the embodiment described but, rather, that it be accorded an interpretation consistent with the scope and spirit of its broad principles.

What is claimed is:

1. A thermal junction reference cabinet comprising an enclosure having a body member and a cover member, means for securing said members together, means for generally thermally insulating the space within said enclosure from the exterior, at least one thermal reference plate mounted in thermally insulated relation to said body member within said enclosure, at least one pair of thermal junction terminals, means for supporting said terminals on said plate, exit wires including wires connected to and extending from said terminals through a first side of said body member to the exterior, means for supporting said exit wires in relation to said body member and for thermally insulating the enclosure interior from the exterior across the exit region of said exit wires, entry wires including wires extending from the exterior through another side of said body member and connected to said terminals, means for supporting said entry wires in relation to said body member, said entry wire supporting means resiliently responsive to pressure from said cover member for producing a substantial thermal seal about said entry wires and substantial thermal insulation of the enclosure interior from the exterior across the entry region of said entry wires.

2. A thermal junction reference cabinet as set forth in claim 1 wherein said body member has a rear wall and an open front side which is enclosed by said cover member, said thermal reference plate is insulatively mounted on said rear body wall, said terminal supporting means includes at least one terminal support structure mounted in thermally conductive relation on the front side of said thermal plate, said terminal support structure has a pair of generally opposed and elongated walls, a wiring channel is formed by generally rearward facing surfaces of said terminal support structure walls and an associated frontally facing surface portion of said thermal plate, said terminals have rear terminal securing portions extending into said wiring channel, said exit wires are secured to said rear securing portions and extend through said channel to the exit region, said terminals also have front securing portions extending generally frontwardly from said terminal support structure walls, and said entry wires extend from the entry region for securance to said front terminal securing portions.

3. A thermal junction reference cabinet as set forth in claim 1 wherein said exit wire supporting means includes at least one resilient thermally insulative exit block including at least one opening therethrough for exit wire passage, said body member has a wall with an exit wiring opening in it, means for supporting said exit block generally to enclose said exit wall opening, and means for applying pressure to said exit block to produce a substantial thermal seal about said exit wall opening and about exit wires extending through said exit block.

4. A thermal junction reference cabinet as set forth in claim 1 wherein said entry wire supporting means includes at least one resilient thermally insulative entry block providable with at least one opening therethrough for entry wire passage, said body member has a rear wall and an open front side, said body member has end and side walls extending frontwardly from said rear wall to said open front body member side, at least one of said end and side walls has at least one slot extending rearwardly from said open front body member side, said entry block is supportedly disposed in said slot, and a portion of said cover member engages said block to produce a substantial thermal seal about said slot and about said entry wires extending through said entry block.

5. A thermal junction reference cabinet as set forth in claim 1 wherein said cover securing means includes at least one latch, and means for adjusting the latching force applied by said latch so as to provide for varying the cover pressure on said entry wire supporting means.

6. A thermal junction reference cabinet as set forth in claim 1 wherein said body member has a plate support wall and said thermal reference plate and at least one additional thermal reference plate are mounted in thermally insulated relation with respect to said wall, said thermal plates are mounted in spaced relation to each other, the space between said thermal plates is generally aligned with the exit wiring region, said terminal pair and at least one pair of additional junction terminals are supported by said terminal supporting means respectively on said thermal plates, and said exit wires include wires extending from said terminal pairs commonly through the space between said thermal plates to the exit region.

7. A thermal junction reference cabinet as set forth in claim 2 wherein said thermal reference plate and at least one additional thermal reference plate are mounted in thermally insulated relation with respect to said rear wall and in spaced relation to each other, the space between said thermal plates is generally aligned with the exit wiring region, said terminal supporting means includes said terminal support structure mounted on one of said thermal plates and at least one other terminal support structure mounted on the other of said thermal plates to form respectively said wiring channel and another similar wiring channel therewith and said exit wires include wires associated with both of said terminal support structures and extend from said wiring channels commonly through the space between said thermal plates to the exit region.

8. A thermal junction reference cabinet as set forth in claim 7 wherein said exit wire supporting means includes at least one resilient thermally insulative exit block having at least one opening therethrough for exit wire passage, said body member rear wall has an exit wiring opening therethrough generally in alignment with the space between said thermal plates, means for supporting said exit block generally to enclose said exit wall opening, means for applying pressure to said exit block to produce a substantial thermal seal about said exit wall opening and about said exit wires extending through said exit block, said entry wire supporting means includes at least one resilient thermally insulative entry block providable with at least one opening therethrough for entry wire passage, said body member has end and side walls extending frontwardly from said rear body wall to said open front body member side, at least one of said end and side walls has at least one slot extending rearwardly from said open front body member side, said entry block is supportedly disposed in said slot, and a portion of said cover member engages said entry block to produce a substantial thermal seal about said slot and about said entry wires extending through said entry block.

9. A thermal junction reference cabinet as set forth in claim 8 wherein said terminal supporting means includes said terminal support structures and a plurality of additional exit wire channel forming terminal support structures mounted on said thermal plates, said exit wire supporting means includes said thermal sealing exit block and a plurality of additional thermal sealing exit blocks through which said exit wires are passed, said exit blocks supported across said exit wall opening, said entry wire supporting means includes said entry block and a plurality of additional cover engaged entry blocks, and said entry block slot and a plurality of additional open front slots located in at least one of said end and side body walls to support said entry blocks.

References Cited

UNITED STATES PATENTS

| | | | |
|---|---|---|---|
| 2,059,480 | 11/1936 | Obermaier | 136—235 X |
| 3,085,140 | 4/1963 | Roe | 200—168 |

ROBERT K. SCHAEFER, *Primary Examiner.*

M. GINSBURG, *Assistant Examiner.*